United States Patent [19]

Mori et al.

[11] Patent Number: 4,800,655

[45] Date of Patent: Jan. 31, 1989

[54] SOLVENT RECOVERY SYSTEM

[75] Inventors: Tetsuya Mori; Hitoshi Tamazumi, both of Kitakyushu, Japan

[73] Assignee: Elze Company, Ltd., Kitakyusyu, Japan

[21] Appl. No.: 57,619

[22] Filed: Jun. 3, 1987

[30] Foreign Application Priority Data

Jul. 7, 1986 [JP] Japan .................. 61-104573

[51] Int. Cl.⁴ .......................... F26B 21/06
[52] U.S. Cl. .......................... 34/77; 34/86
[58] Field of Search .......................... 34/77, 86

[56] References Cited

U.S. PATENT DOCUMENTS 3,064,358  11/1982  Giuffre .................. 34/77
4,196,526  4/1980  Berti .................. 34/77

Primary Examiner—Henry A. Bennet
Attorney, Agent, or Firm—Harris, Kern, Wallen & Tinsley

[57] ABSTRACT

A solvent recovery system in a low temperature dryer constructed so that hot air is blown into a tumbler housing from a heater, and through a tumbler drum to a cooler in a condenser compressor, a gas evaporator, a gas condenser coil, an expansion valve, and valves and piping provide the circulation of cooled and pressurized refrigerant between the heater and the cooler.

4 Claims, 1 Drawing Sheet

U.S. Patent  Jan. 31, 1989  4,800,655
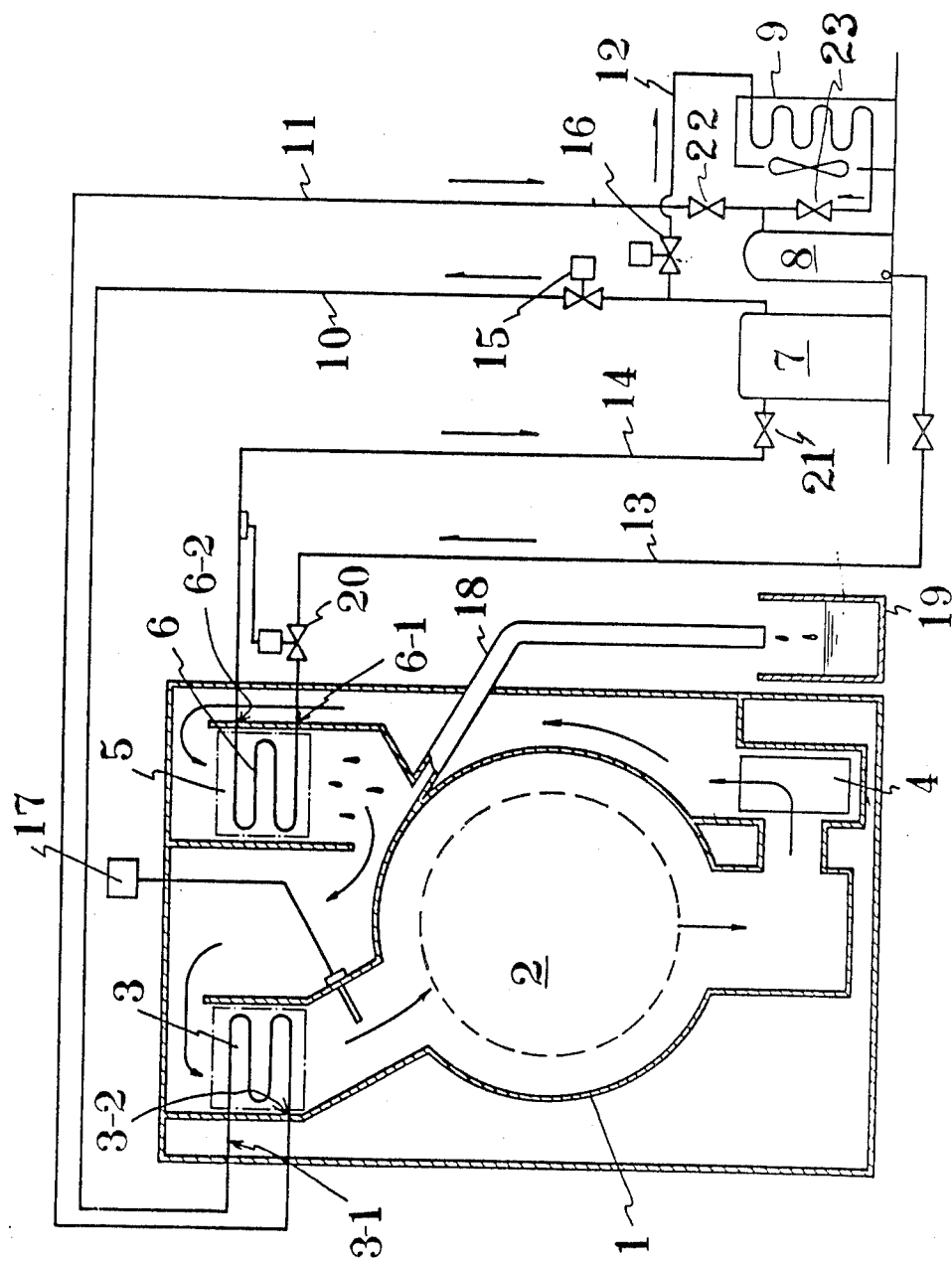

SOLVENT RECOVERY SYSTEM

BACKGROUND OF THE INVENTION

This invention relates to a solvent recovery system for use in drying articles at relatively low temperature, and is particularly applicable to dry cleaning of clothing and the like.

In the past, a dryer has been used to recover the solvent absorbed by clothes which have been cleaned to remove dirt. After being washed in solvent, the articles are placed in the dryer and hot air from a heater is blown onto the clothes to evaporate the absorbed solvent. Separation of the solvent from the clothing occurs and the evaporated solvent is subsequently cooled by a cooler for condensation and recovery of the solvent.

The hot air for the solvent evaporation is obtained from a separate boiler. A chilling unit or well water is used for cooling the air after passing through the dryer, and the heat from the exhaust is discharged into the atmosphere from the cooling tower or an air cooled condenser.

Consequently, there is a waste of discharged heat from the chilling unit and, furthermore, the overall construction is big and cumbersome and a boiler is required to be installed as a drying device for the purpose of solvent recovery. When boiler steam is used as a heat source, the temperature is near 100 degrees Celsius (near 212 degrees F.) and the temperature inside the tumbler is difficult to control. Sometimes the heating inside the tumbler exceeds the ignition point of the solvent and an environment is created in which the solvent ignites easily and a situation is produced in which there is danger of an explosion caused by the ignition of the solvent. Such earlier systems are expensive and the operating conditions for correct vaporization and condensation to take place are difficult to achieve. Further, such systems have the disadvantage of complexity due to the numerous adjustments required during the process of operation of the system.

SUMMARY OF THE INVENTION

The invention comprises a low temperature drying device for solvent recovery in dry cleaning, with a drying air circulating path through a heater, a tumbler and a cooler, and a refrigerant circulating path through a compressor, the heater, an evaporator and the cooler.

In the system of the present invention, hot air is blown from a heater to the inside of the dryer tumbler, and the dryer exhaust is connected to the cooler in a condenser compartment. The condenser operates to condense and recover the solvent from the circulating air. The system also includes a refrigerant gas condenser coil, an expansion valve, and appropriate control valves.

In the system of the present invention the in-process articles which have been washed in solvent are put into the tumbler compartment and high temperature, high pressure refrigerant gas, pressurized by the refrigerant gas compressor, is sent to the heater, and hot air heated by the heater is blown into the tumbler compartment. The in-process articles are dried by hot air from the heater and the solvent is vaporized. The vaporized solvent is sent to the condenser compartment and is cooled and condensed by the cooler, and recovery of the solvent takes place. The high temperature, high pressure refrigerant gas from the heater passes to the evaporator and, from this same evaporator, the gas undergoes adiabatic expansion and arrives at the cooler. Then the gas returns to the compressor and again circulates as high temperature, high pressure gas for heating. Whenever the temperature produced by the heater reaches the selected temperature, the pressurized gas from the compressor is re-routed to the gas condenser by the operation of a valve and, at this condenser heat radiation condensation takes place. The gas returns from the condenser to the gas evaporator for subsequent use in cooling.

In this way, whenever the air from the heater arrives at the selected temperature, heat radiation condensation occurs and excellently established heat exchange balance is realized between the heater and the condenser, and operation under excessive heat is controlled and such dangers as ignition of solvent by unnecessary heat are reduced.

The effect is that, with this invention, neither steam nor water is used and dry cleaning takes place with the operation of heating and cooling for the purpose of solvent recovery and, simultaneously, the heat exchange balance of the heating and cooling is made uniform and such dangers as the ignition of the solvent by unnecessarily excessive heat is prevented and, in spite of the fact that the equipment is simple, reliable solvent recovery takes place and operation is favorable from the cost standpoint.

BRIEF DESCRIPTION OF THE DRAWING

The single figure of the drawing is a diagrammatic illustration of a solvent recovery system incorporated in a dryer for a dry cleaning system, and incorporating the presently preferred embodiment of the invention.

DESCRIPTION OF THE PREFERRED EMBODIMENT

The solvent recovery system of the invention is described herein as used with a dryer for a clothing dry cleaning system, wherein the articles of clothing are dried by tumbling in a rotating perforated drum or the like and hot air is blown through the tumbler. Referring to the drawing figure, a tumbler compartment or drum 2 is positioned within a tumbler encasement or housing 1. Air is circulated through a heater 3 and a cooler 6 in a condenser compartment 5, by an air blower 4. The heater 3 has a coil or other form of heating exchanger and the cooler 6 has a coil or other form of cooling exchanger.

A refrigerant, typically freon gas, is utilized for heating and cooling. This system includes a refrigerant compressor 7, a refrigerant evaporator 8, and a refrigerant condenser coil 9. Hot compressed gas is delivered to the heater inlet 3-1 through a control valve 15 and a pressurized gas delivery pipe 10, and condensed refrigerant is returned from the heater 3 to the evaporator 8 via the heater outlet 3-2 and pipe 11. Refrigerant is delivered to the cooler 6 from the evaporator 8 through pipe 13 and expansion valve 20 to cooler inlet 6-1, and is returned from cooler outlet 6-2 via pipe 14 to the compressor 7. Hot compressed gas is also connected from the compressor 7 to the condenser coil 9 through another control valve 16 and pipe 12, with the output from the condenser 9 returning to the evaporator 8. Conventional check valves 21, 22 and 23 are positioned in the pipes at the inputs to the refrigerant compressor 7 and refrigerant evaporator 8. The operation of the refrigeration components including the compressor, evaporator and condenser and the interconnecting piping is conventional.

A heat sensor 17 is mounted in the air flow path from the heater to the tumbler housing. A solvent drain pipe 18 is positioned at the bottom of the compartment for the condenser 5, for delivery of liquid solvent to a solvent recovery tank 19.

In operation, the clothing articles wet with solvent are inserted into the tumbler drum 2 which is rotated by a conventional motor drive. Air is circulated in the path from the blower 4 through the condenser 5 and cooler 6 and the heater 3 through the drum 2 back to the blower 4. The air passing through the heater 3 is heated by the hot compressed refrigerant from the compressor 7. The hot air passing through the tumbler drum 2 serves to evaporate the solvent and carry it into the condenser 5. The air passing through the condenser 5 is cooled by the refrigerant which has been expanded from a liquid to a gas and cooled at the expansion valve 20. The air passage through the condenser/cooler is cooled and solvent is condensed from a gas to a liquid, with the solvent being drained off through the pipe 18 and collected in the tank 19. The refrigerant gas from the cooler is returned to the compressor via the pipe 14, and the refrigerant liquid from the heater is returned to the evaporator through the pipe 11.

If the temperature at the inlet to the tumbler housing 1 rises above the prescribed temperature limit during the air heating operation, as measured at the heat sensor 17, the valve 15 in the pressurized gas delivery pipe 10 will close and the valve 16 in the transfer pipe 12 will open. Then the route of the pressurized gas will change from going to the heater 3 to going to the gas condenser coil 9 and refrigerant condensation will take place through the action of the condenser coil 9. When the temperature drops below the limit, the valves 15 and 16 will return to the original positions and normal heating-cooling flow will be reestablished.

With the above described operation, neither steam nor water is used and the cleaning solvent is recovered. Also when there is variation from the selected temperature during drying, the gas condenser is switched into operation and refrigerant cooling and condensation takes place to eliminate the unwanted heat. Equalization is accomplished by the heat exchange balance of the heater and cooler, and the likelihood of cleaning solvent ignition due to overheating is eliminated.

We claim:

1. In a solvent recovery system for use with a dry cleaning system or the like having a tumbler and a blower, the combination of:

an air heater;

an air cooler;

a housing defining an air recirculating path from said tumbler to said air cooler, said air heater, and return to said tumbler, with said blower in said air recirculating path for moving air around said air recirculating path;

a refrigerant compressor out of said air recirculating path;

a refrigerant evaporator out of said air recirculating path;

a heating exchanger in said air heater in said air recirculating path;

a cooling exchanger in said air cooler in said air recirculating path; and first means for connecting said refrigerant compressor, said heating exchanger, said refrigerant evaporator and said cooling exchanger in a refrigerant recirculating path while maintaining said refrigerant evaporator out of said air recirculating path.

2. A solvent recovery system as defined in claim 1 including means for collecting condensed liquid solvent at said air cooler, and a line providing for liquid flow from said collecting means to a container.

3. A solvent recovery system as defined in claim 2, including an expansion valve in line between said refrigerant evaporator and said cooling exchanger.

4. A solvent recovery system as defined in any of claim 1–3 including:

a refrigerant condenser coil;

second means for connecting said refrigerant condenser coil between said refrigerant condenser and said refrigerant evaporator; and valve means for controlling refrigerant flow through said second connecting means.

* * * * *